United States Patent
Chikovani et al.

(10) Patent No.: US 9,372,842 B2
(45) Date of Patent: Jun. 21, 2016

(54) METHOD AND SYSTEM FOR IMPLEMENTING VERSIONS OF A SALES CATALOG

(71) Applicant: Oracle International Corporation, Redwood Shores, CA (US)

(72) Inventors: Eugene G. Chikovani, Cupertino, CA (US); Qiaolin Jin, San Jose, CA (US); Hang Lu, Foster City, CA (US); Vibhor K. Gaur, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 14/015,553

(22) Filed: Aug. 30, 2013

(65) Prior Publication Data

US 2014/0068405 A1 Mar. 6, 2014

Related U.S. Application Data

(60) Provisional application No. 61/694,910, filed on Aug. 30, 2012, provisional application No. 61/780,379, filed on Mar. 13, 2013.

(51) Int. Cl.
*G06F 17/00* (2006.01)
*G06F 17/22* (2006.01)

(52) U.S. Cl.
CPC .................................. *G06F 17/2288* (2013.01)

(58) Field of Classification Search
CPC .................................................. G06F 17/2288
USPC ......................................................... 715/229
See application file for complete search history.

(56) References Cited

U.S. PATENT DOCUMENTS

| | | | | |
|---|---|---|---|---|
| 6,557,012 | B1 * | 4/2003 | Arun | G06F 17/30309 |
| 7,730,032 | B2 * | 6/2010 | Idicula | G06F 17/3023 |
| | | | | 707/638 |
| 7,913,161 | B2 * | 3/2011 | Rivas, Jr. | G06F 17/2229 |
| | | | | 715/229 |
| 8,230,326 | B2 * | 7/2012 | Albornoz | G06F 17/241 |
| | | | | 715/229 |
| 8,326,869 | B2 | 12/2012 | Kolluri et al. | |
| 8,862,991 | B2 * | 10/2014 | Harrington | G06F 17/2288 |
| | | | | 715/229 |
| 2001/0032209 | A1 * | 10/2001 | Duxbury | 707/511 |
| 2003/0115547 | A1 * | 6/2003 | Ohwada | G06F 17/30011 |
| | | | | 715/229 |
| 2005/0125781 | A1 | 6/2005 | Swamy et al. | |
| 2005/0177436 | A1 | 8/2005 | Menninger | |

(Continued)

OTHER PUBLICATIONS

Non-final Office Action dated Mar. 19, 2015 for U.S. Appl. No. 14/015,560.

(Continued)

*Primary Examiner* — Keith Bloomquist
(74) *Attorney, Agent, or Firm* — Vista IP Law Group, LLP

(57) ABSTRACT

Described is an improved approach for implementing a handshake mechanism to permit effective versioning and updates for data within an enterprise application. Version numbers are associated with sales catalog objects, where the appropriate version number is associated with the specific object to be published as the run-time object for the sales catalog. Each of the sales catalog versions is associated with a unique identifier, where one of the identifiers is recognized as the "runtime" version identifier. The sales catalog having the recognized run-time identifier value is visible to and accessible to the ordinary users of the system as the runtime sales catalog. All other sales catalog versions associated with other identifiers are not visible/accessible to ordinary users.

32 Claims, 13 Drawing Sheets

(56) References Cited

U.S. PATENT DOCUMENTS

2008/0133618 A1* 6/2008 Kawabe ............ G06F 17/30011
2008/0134025 A1* 6/2008 Harada .................. G06F 17/24
                                                    715/255
2011/0029634 A1* 2/2011 Gimson .............. G06F 17/2288
                                                    709/217

OTHER PUBLICATIONS

"PeopleSoft Enterprise Catalog Management," Oracle PeopleSoft Enterprise, Dec. 2002 (13 pages).
Final Office Action dated Oct. 8, 2015 for related U.S. Appl. No. 14/015,560.

* cited by examiner

METHOD AND SYSTEM FOR IMPLEMENTING VERSIONS OF A SALES CATALOG

CROSS-REFERENCE TO RELATED APPLICATIONS

The present application claims the benefit of U.S. Provisional Application No. 61/694,910, filed on Aug. 30, 2012, titled "METHOD AND SYSTEM FOR IMPLEMENTING VERSIONS OF A SALES CATALOG" and U.S. Provisional Application No. 61/780,379, filed on Mar. 13, 2013, titled "METHOD AND SYSTEM FOR IMPLEMENTING VERSIONS OF A SALES CATALOG", both of which are hereby incorporated by reference in their entirety. The present application is related to U.S. Ser. No. 14/015,577, entitled "METHOD AND SYSTEM FOR IMPLEMENTING A CRM QUOTE AND ORDER CAPTURE CONTEXT SERVICE", U.S. Ser. No. 14/015,560, entitled "METHOD AND SYSTEM FOR IMPLEMENTING PRODUCT GROUP MAPPINGS", and U.S. Ser. No. 14/015,546, entitled "METHOD AND SYSTEM FOR IMPLEMENTING AN ARCHITECTURE FOR A SALES CATALOG", all filed on even date herewith and all hereby incorporated by reference in their entirety.

BACKGROUND

The present application relates to software development and more specifically to systems, methods, and patterns for implementing enterprise software applications.

Many types of business logic are implemented by enterprise software applications. For example, CRM applications often implement business logic to perform price quotations and order capture for customers. For the price quotation business logic, a pricing engine may be implemented to receive input data (e.g., product name or product ID) and to return output data that includes the price for each product in the input data. For the order capture business logic, an order capture engine and/or eligibility engine may be used to receive input data regarding a potential order (e.g., customer ID and product ID) and provide output data regarding the order capture or order eligibility.

A sales catalog comprises the set of data commonly accessed by a CRM system. The sales catalog includes information relating to the products offered for sale by the company, such as pricing information, product descriptions, product images, and the like. FIG. 2 provides an illustration of an example interface 200 that displays a list of product details that may be captured within a sales catalog. The sales catalog may be accessed, for example, by the business logic that is used to perform price quotations and order capture for customers.

There will be occasions when the sales catalog may need to be updated. For example, the sales catalog may need to be changed when a company needs to change pricing, revise product offerings, or change product descriptions for its offerings. Authoring, updating, and publication of a new version of the sales catalog can be a very iterative and time consuming process involving cooperation of multiple users. The problem is that until the changes have been finalized, the production users of the system should not normally be permitted to access the in-progress state of the sales catalog being modified. Otherwise, premature access to the in-progress data can lead to data inconsistencies, collisions, or conflicts. Therefore, careful orchestration of the editing and publishing processes is a complex task that needs careful coordination to avoid these types of problems. This is needed to ensure that while the publishing process is running (e.g., a long running asynchronous process), production users are prevented from making any modifications to the set of product groups that are being published.

SUMMARY

Some embodiments of the invention provide an improved approach for implementing a handshake mechanism to permit effective versioning and updates for data within an enterprise application. Version numbers are associated with sales catalog objects, where the appropriate version number is associated with the specific object to be published as the run-time object for the sales catalog. Each of the sales catalog versions is associated with a unique identifier, where one of the identifiers is recognized as the "run-time" version identifier. The sales catalog having the recognized run-time identifier value is visible to and accessible to the ordinary users of the system as the runtime sales catalog. All other sales catalog versions associated with other identifiers are not visible/accessible to ordinary users. Once the updates have been made to the non-runtime version of the sales catalog, that updated sales catalog can be recognized by the system as the new runtime sales catalog by swapping the version number associated with that updated version to be the new runtime version.

Other and additional objects, features, and advantages of the invention are described in the detailed description, figures, and claims.

DETAILED DESCRIPTION

The embodiments of the invention provide an improved approach for implementing a handshake mechanism to permit effective versioning and updates for data within an enterprise application.

According to some embodiments, version numbers are associated with sales catalog objects, where the appropriate version number is associated with the specific object to be published as the run-time object for the sales catalog. In effect, each of the sales catalog versions is associated with a unique identifier, where one of the identifiers is recognized as the "run-time" version identifier. The sales catalog having the recognized run-time identifier value is visible to and accessible to the ordinary users of the system as the runtime sales catalog.

All other sales catalog versions associated with other identifiers are not visible/accessible to ordinary users. The non-runtime versions can therefore be updated and/or operated upon without having any effect upon the access by users to the runtime version of the sales catalog. Once the updates have been made to the non-runtime version of the sales catalog, that updated sales catalog can be recognized by the system as the new runtime sales catalog by designating the version number associated with that updated version to be the new runtime version.

This "swap" of the version numbers by the system therefore provides a very quick and extremely efficient way to make the new version of the sales catalog available to the users of the system. This approach allows updates to be performed with only minimal impact upon users, since the admin versions of the catalog can be operated upon without impairing access by users to the sales catalog. In addition, once the updates have been performed, the swapping action only needs to be performed upon a small amount of data (the runtime identifier value -- and not the entirety of the data volume for the sales catalog), which allows the swap of the admin version to be the new runtime version to be performed extremely quickly.

Figure 1:
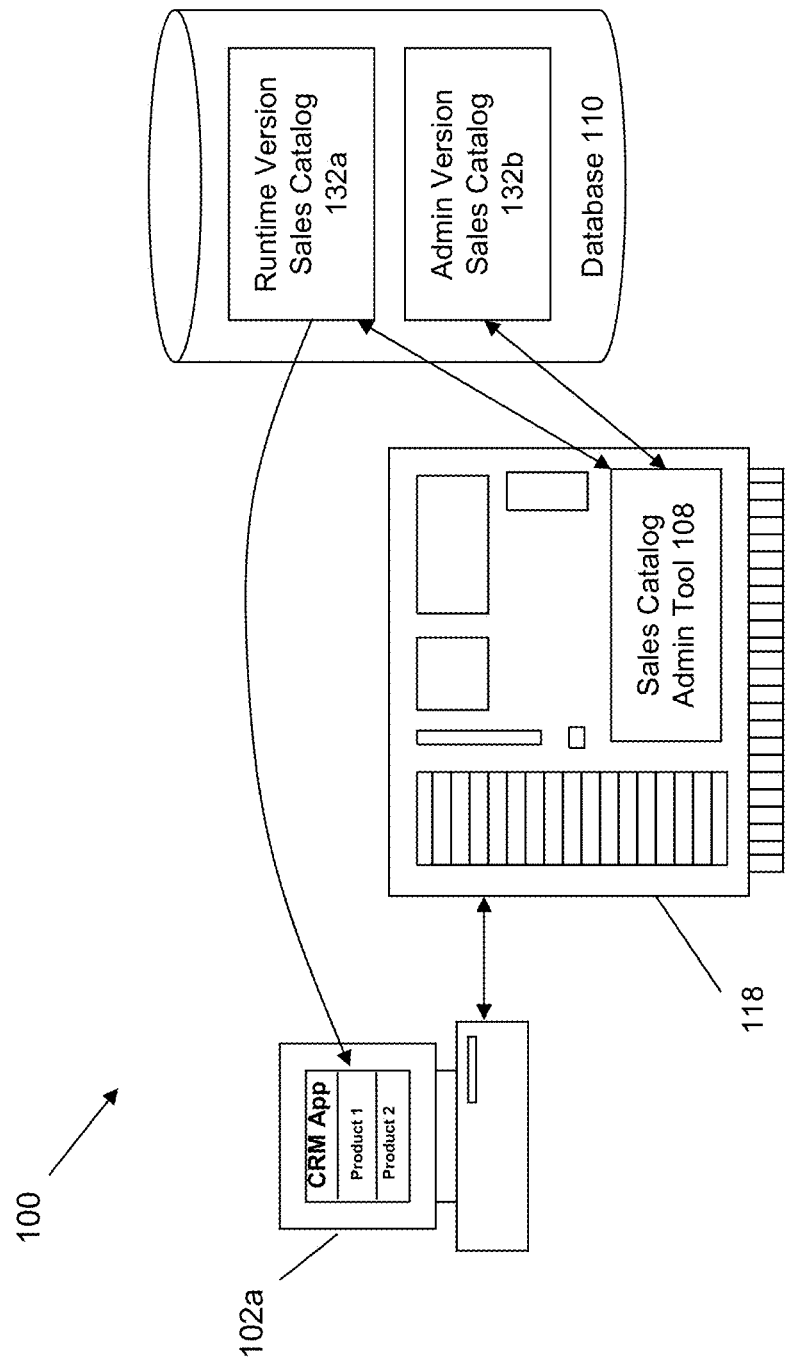
FIG. 1 shows an architecture of a system for implementing and coordinating versions of a sales catalog according to some embodiments of the invention.

FIG. 1 shows an architecture of a system 100 for implementing and coordinating versions of a sales catalog according to some embodiments of the invention. System 100 may include one or more users at one or more user stations 102a, where the users operate the system 100 to access and utilize applications (e.g., CRM applications) on an application server 118 to perform any activities operable using the application server 118. The CRM application on application server 118 may be used to access a sales catalog 132a in a database 110.

Figure 2:
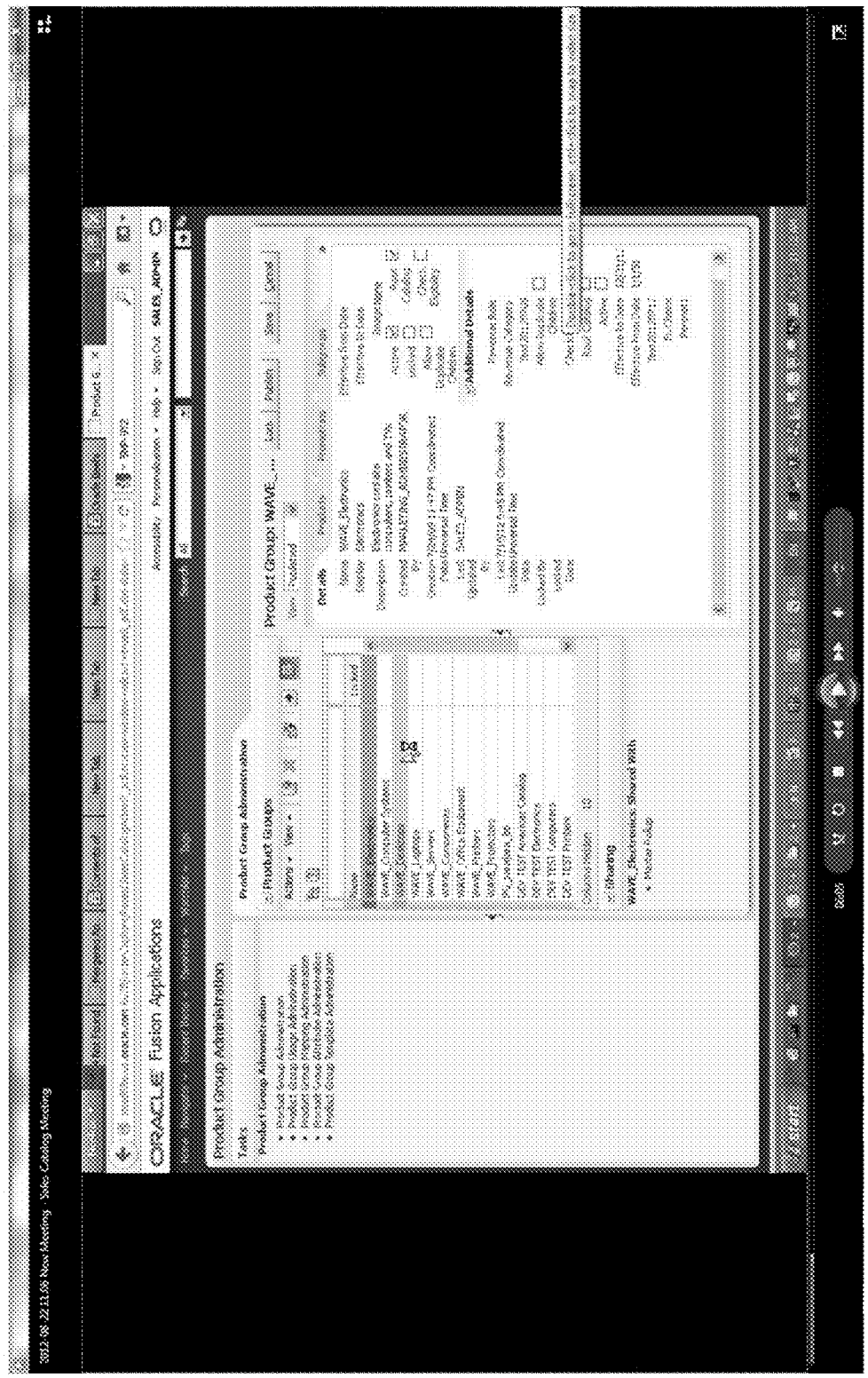
FIG. 2 illustrates an example interface for editing the contents of the sales catalog.
Figure 3:
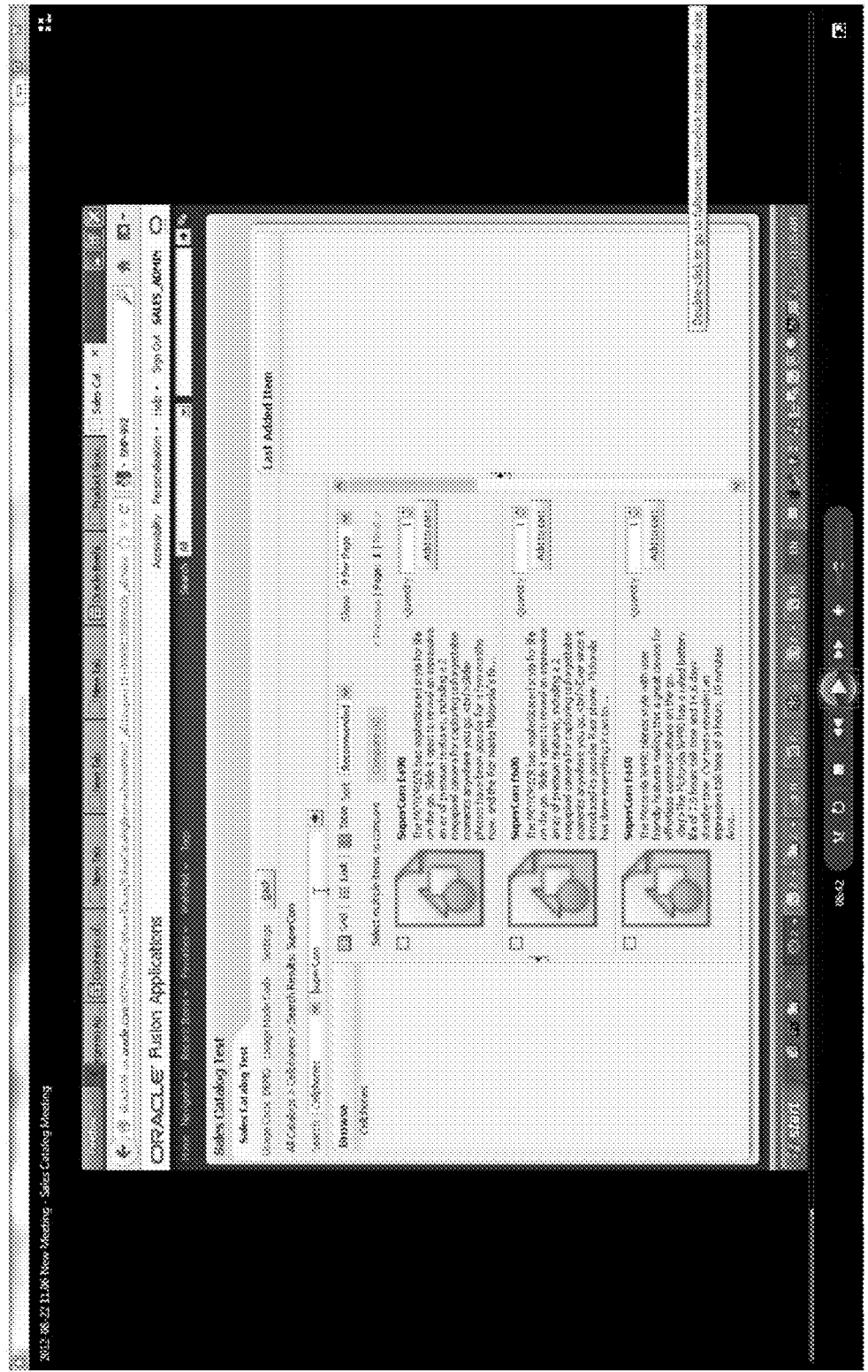
FIG. 3 illustrates an example interface showing sales catalog objects accessible through an admin tool.

The user may use a sales catalog admin tool 108 to author, modify, or update the data within the sales catalog. FIG. 2 illustrates an example interface 200 for editing the contents of the sales catalog. Any suitable type of type of editing may occur to the sales catalog. For example, editing may occur to add new products to the catalog, change product hierarchies, modify catalog behavior and engine associations, and change parameters and details for products. FIG. 3 illustrates an example interface 300 showing sales catalog objects accessible through an admin tool.

During the authoring process, the workspace will include an admin version 132b of the sales catalog object. The admin version 132b is associated with a version number indicative of the object being an admin version (rather than a run-time version). Similarly, the runtime version 132a is associated with a different version number indicative of the object being a runtime version (rather than an admin version). When ready for publication, a swap will occur for the version numbers associated with both the run-time version 132a and the admin version 132b. This swapping action is implemented by swapping only the single run-time version number indicator (but not the data stored across the content). This swap of the version numbers operates to effect publication of the new version in the workspace as the new run-time version of the sales catalog.

In system 100, user station 102a comprises any type of computing station that may be used to operate or interface with a server 118. Examples of such user stations 102 include for example, workstations, personal computers, laptop computers, or remote computing terminals. User station 102a may also correspond to any type of portable tablet device, including for example, tablet computers, portable readers, smartphones, and/or programmable mobile handsets. The embodiments of the invention are applicable to any computing device that works in conjunction with an application that access a sales catalog or other forms of CRM data.

The user station 102a comprises a display device, such as a display monitor or screen, for displaying scheduling data and interface elements to users. The user station 102a may also comprise one or more input devices for the user to provide operational control over the activities of system 100, such as a mouse, touch screen, keypad, or keyboard. The users of user station 102a correspond to any individual, organization, or other entity that uses system 100 to access applications on application server 118, such as a CRM application on application server 118.

The database 110 corresponds to any type of computer readable mediums or storage devices. The computer readable storage devices comprise any combination of hardware and software that allows for ready access to the data within database 110. For example, the computer readable storage device could be implemented as computer memory or disk drives operatively managed by an operating system.

Figure 4:
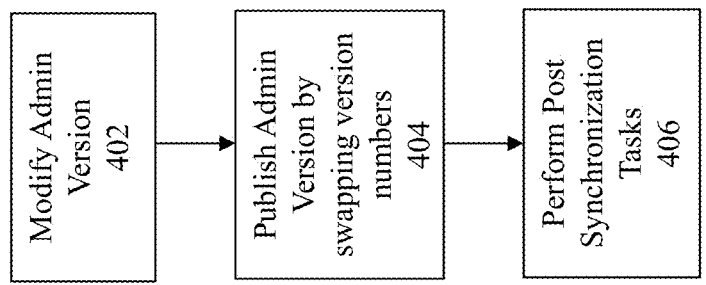
FIG. 4 illustrates a flowchart of an approach to implement some embodiments of the invention.

FIG. 4 illustrates a flowchart of an approach to implement some embodiments of the invention. This approach in some embodiments is implemented by having a base object for the sales catalog having a header table and a large number of child tables. The record on the header table has two key version related fields, where they have different values at any time, 0 or 1: (i) Admin_Version_Number and (ii) Runtime_Version_Number.

In addition, each child table has two set of records with different version numbers—a -version "1" and a version "0". One version is for the runtime version and the other is a workspace version for admin purposes. The Admin_Version_Number and Runtime_Version_Number on the base object will indicate which version is visible to runtime and which version is used by the admin tool for editing as workspace.

At 402, authoring, updating, and/or modification of the sales catalog are performed by modifying the admin version of one or more objects. The admin version is the version of the object associated with the appropriate version number indicative of being an admin version in the workspace.

At 404, after all edits have been performed and the appropriate validations have occurred, the admin version is ready to be published as the new runtime version of the sales catalog objects. During publish time, a single short transaction will be used to swap the admin_version_number and runtime_version_number on the base object being published. This swapping of the version numbers will make the old workspace version to become runtime version.

At 406, post synchronization tasks can be performed against the sale catalog objects. The post synchronization process can be used, for example, to slowly copy the new runtime version content to the new workspace version so that they will be in sync. As this only changes the new workspace version, this process should not impact runtime performance of the system.

Figure 5A:
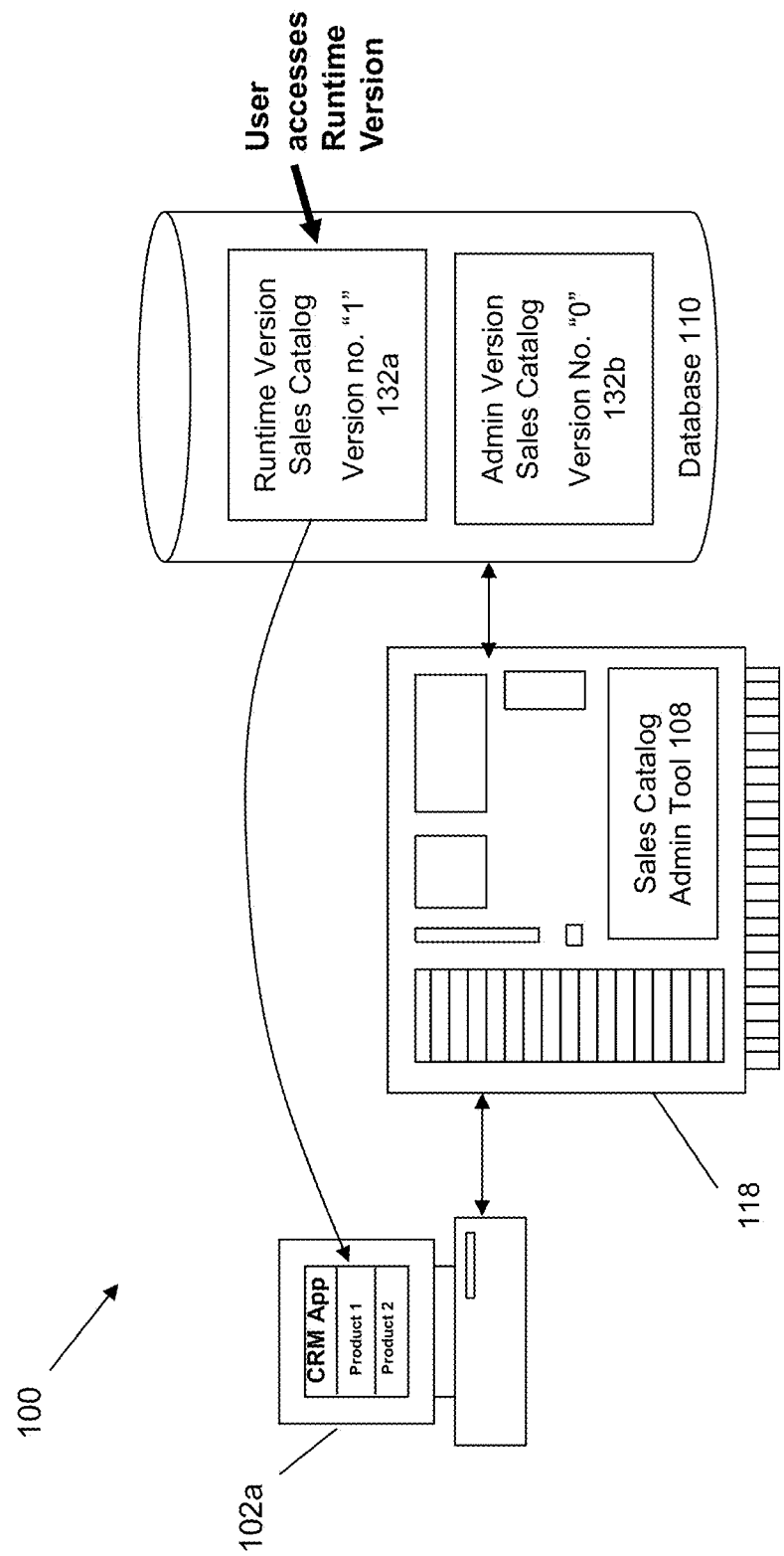
FIGS. 5A-D illustrate the inventive approach according to one embodiment.

FIGS. 5A-D illustrate this process according to one embodiment. FIG. 5A shows the system 100, where one or more users at user station 102a is currently using a CRM application on application server 118 to access the runtime version 132a of the sales catalog in a database 110. An admin version 132b of the sales catalog also exists in a workspace. The runtime version 132a is associated with the appropriate version number (e.g., version number "1") to indicate that it is the run-time version of the sale catalog. The admin version 132b is associated with the appropriate version number (e.g., version number "0") to indicate that it is the admin version of the sale catalog.

Figure 5B:
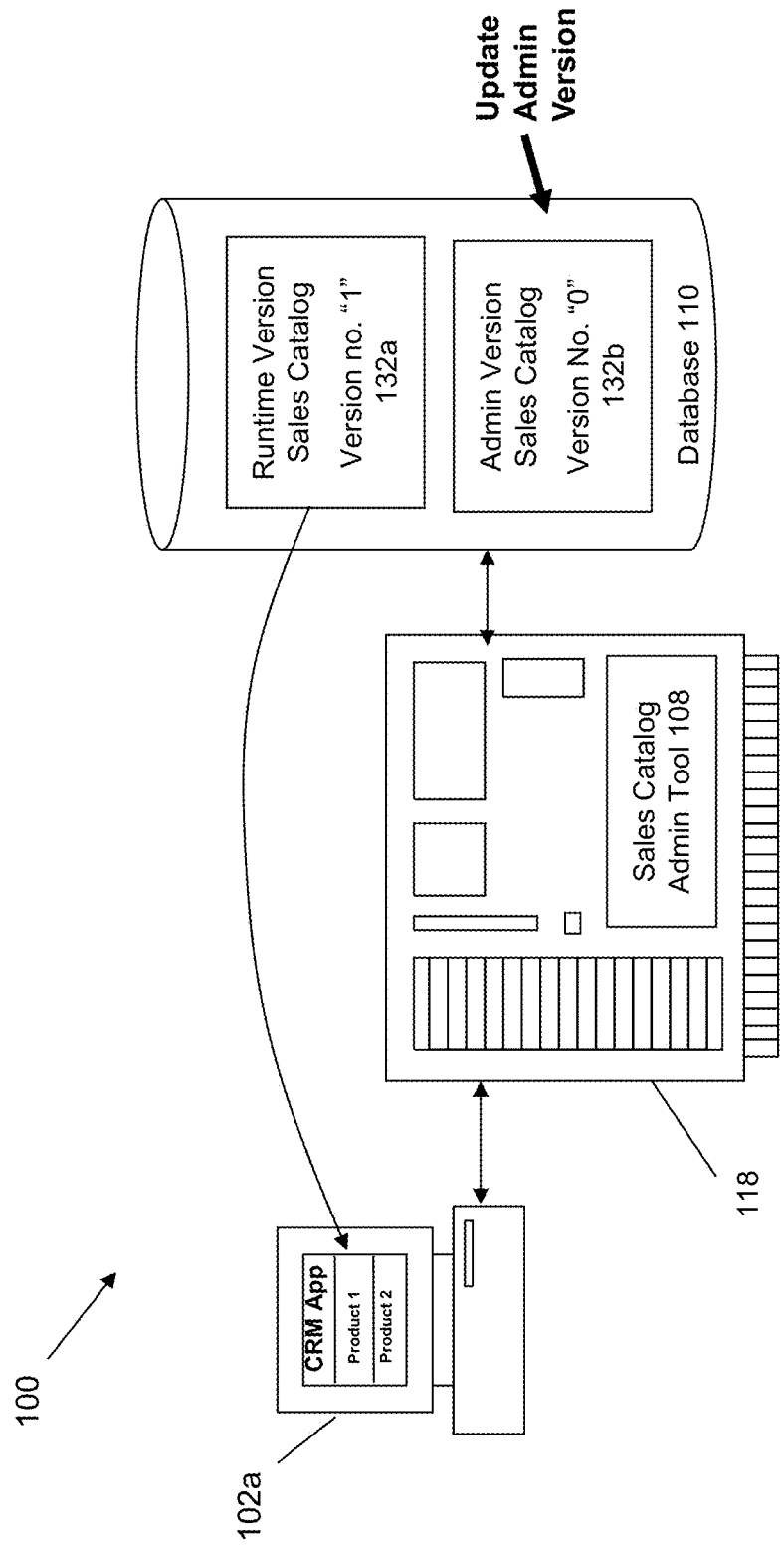

FIG. 5B illustrates when a user is using the admin tool 108 to edit the contents of the admin version 132b of the sales catalog in the workspace. At this point, the production users at the user station 102a are isolated from the admin version 132b of the sales catalog. This is because the admin version 132b is still associated with the version number indicative of the object being an admin version (rather than a run-time version). Similarly, the runtime version 132a is still associated with a different version number indicative of the object being a runtime version (rather than an admin version).

Figure 5C:
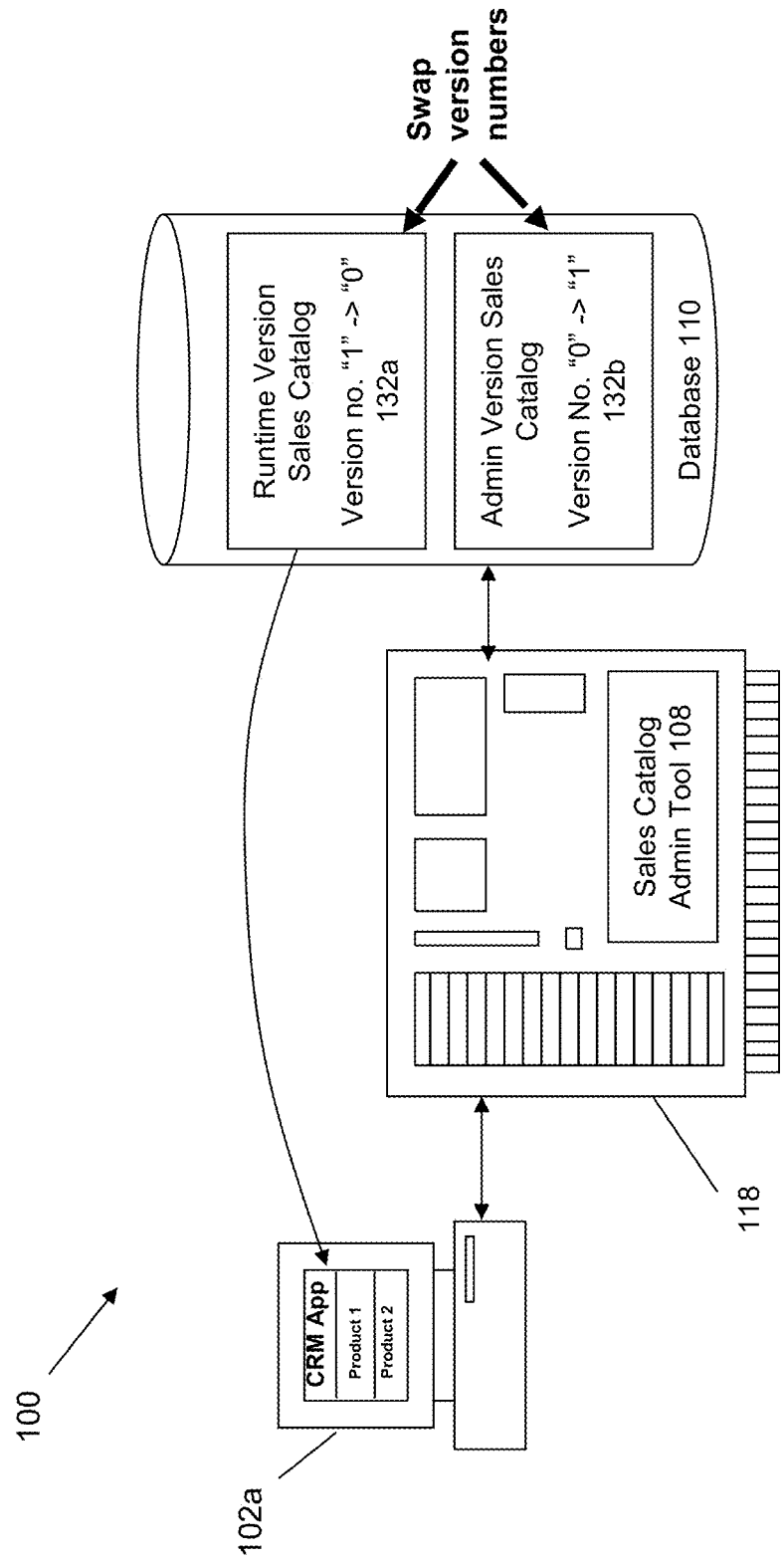

When ready for publication, a swap will occur for the version numbers associated with both the run-time version 132a and the admin version 132b. FIG. 5C illustrates this swapping process. Version 132a has its version number changed from "1" to "0". Similarly, version 132b has its version number changed from "0" to "1".

Figure 5D:
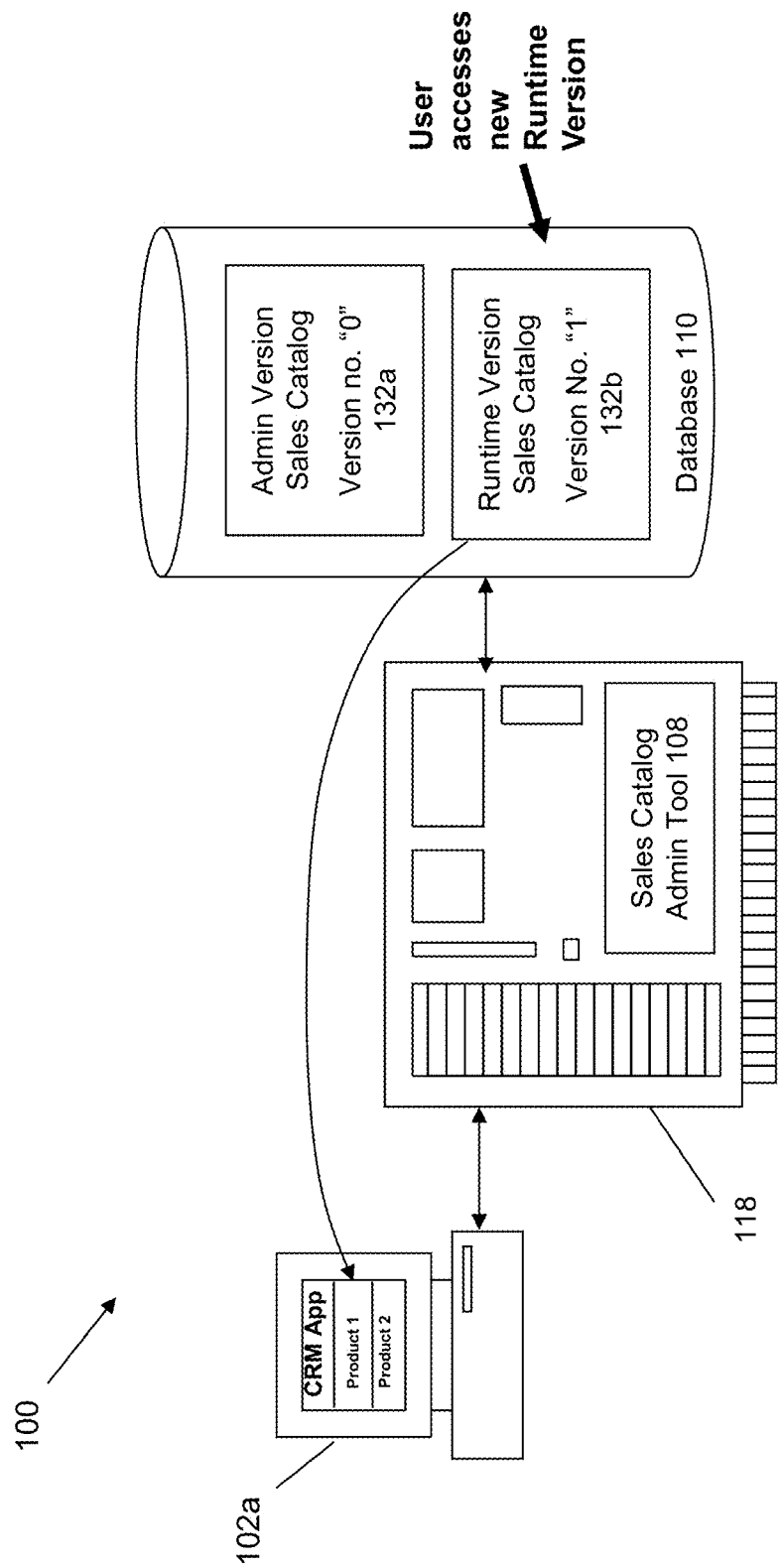

As shown in FIG. 5D, this swap of the version numbers operates to effect publication of the new version in the workspace as the new run-time version of the sales catalog. This is because the new run-time version 132b (formerly admin version) is now associated with the appropriate version number (e.g., version number "1") to indicate that it is the run-time version of the sale catalog. The new admin version 132a (formerly runtime version) is associated with the appropriate version number (e.g., version number "0") to indicate that it is the admin version of the sale catalog.

Figure 6A:
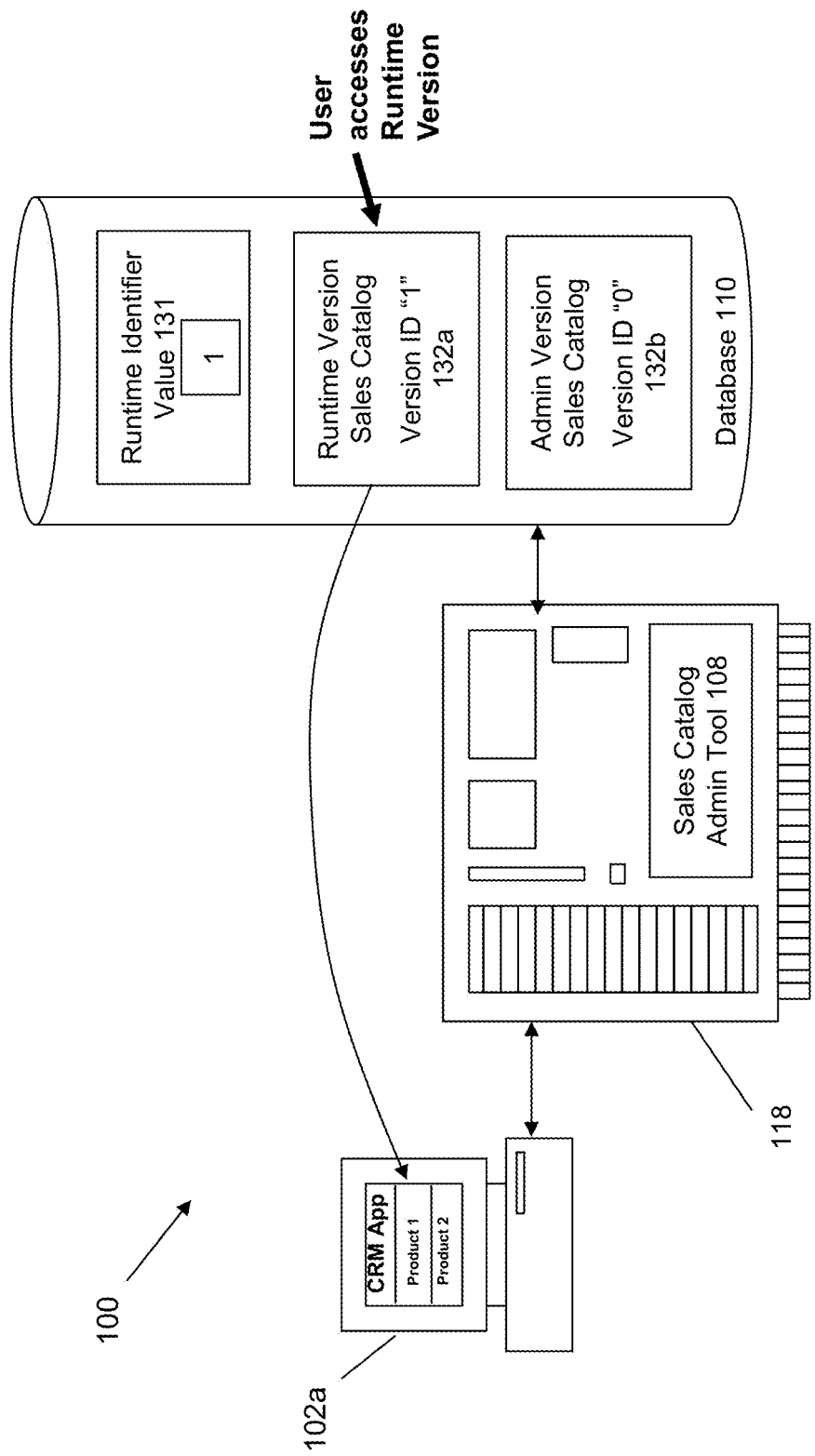
FIGS. 6A-D illustrate the inventive approach according to another embodiment.

FIGS. 6A-D illustrate this process according to another embodiment. FIG. 6A shows the system 100, where one or more users at user station 102a is currently using a CRM application on application server 118 to access the runtime version 132a of the sales catalog in a database 110. An admin version 132b of the sales catalog also exists in a workspace. The runtime version 132a is associated with a given version identifier (e.g., version ID "1"). The admin version 132b is associated with the another version identifier (e.g., version ID "0").

Metadata 131 exists in the system to identify which of the sale catalog versions is currently the runtime version. Here, the runtime ID metadata 131 indicates that the sales catalog associated with a version ID value of "1" (i.e., sales catalog runtime version 132a) is the current run-time version of the sale catalog. All other sales catalogs having other version ID values are non-runtime versions (i.e., admin version 132b).

Figure 6B:
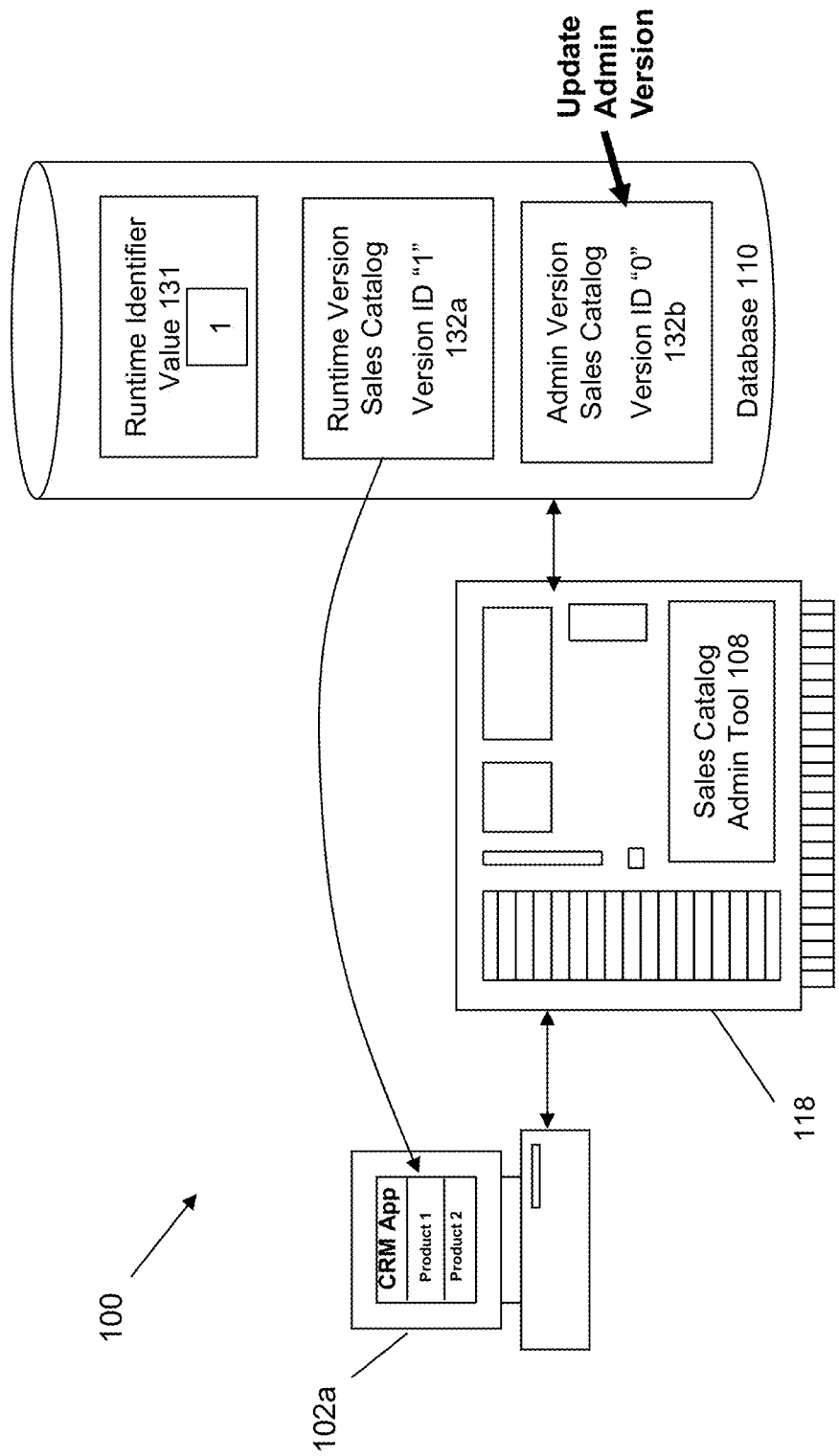

FIG. 6B illustrates when a user is using the admin tool 108 to edit the contents of the admin version 132b of the sales catalog in the workspace. As before, the production users at the user station 102a are isolated from the admin version 132b of the sales catalog, since the admin version 132b is still associated with the version number indicative of the object being an admin version (rather than a run-time version). Similarly, the runtime version 132a is still associated with a different version number indicative of the object being a runtime version (rather than an admin version).

Figure 6C:
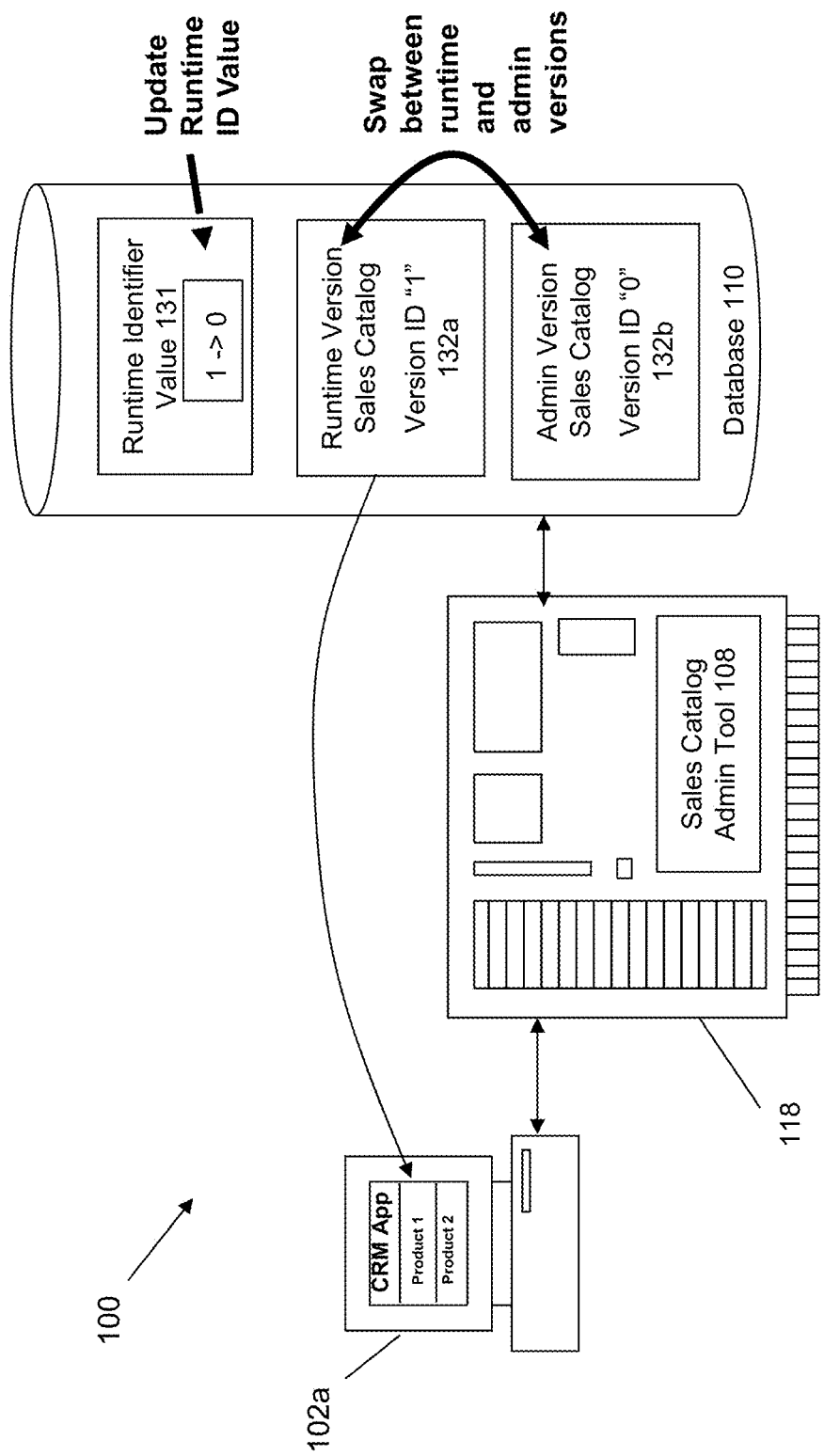

When ready for publication, a swap will occur for the version numbers associated with both the run-time version 132a and the admin version 132b. FIG. 6C illustrates this swapping process, where the metadata 131 has its runtime ID value changed from "1" to "0". This swap therefore identifies sales catalog version 132a (which is associated with ID value "0") as the new runtime version of the sales catalog. This also identifies sales catalog version 132a (which is associated with ID value "1") as no longer being the runtime version.

Figure 6D:
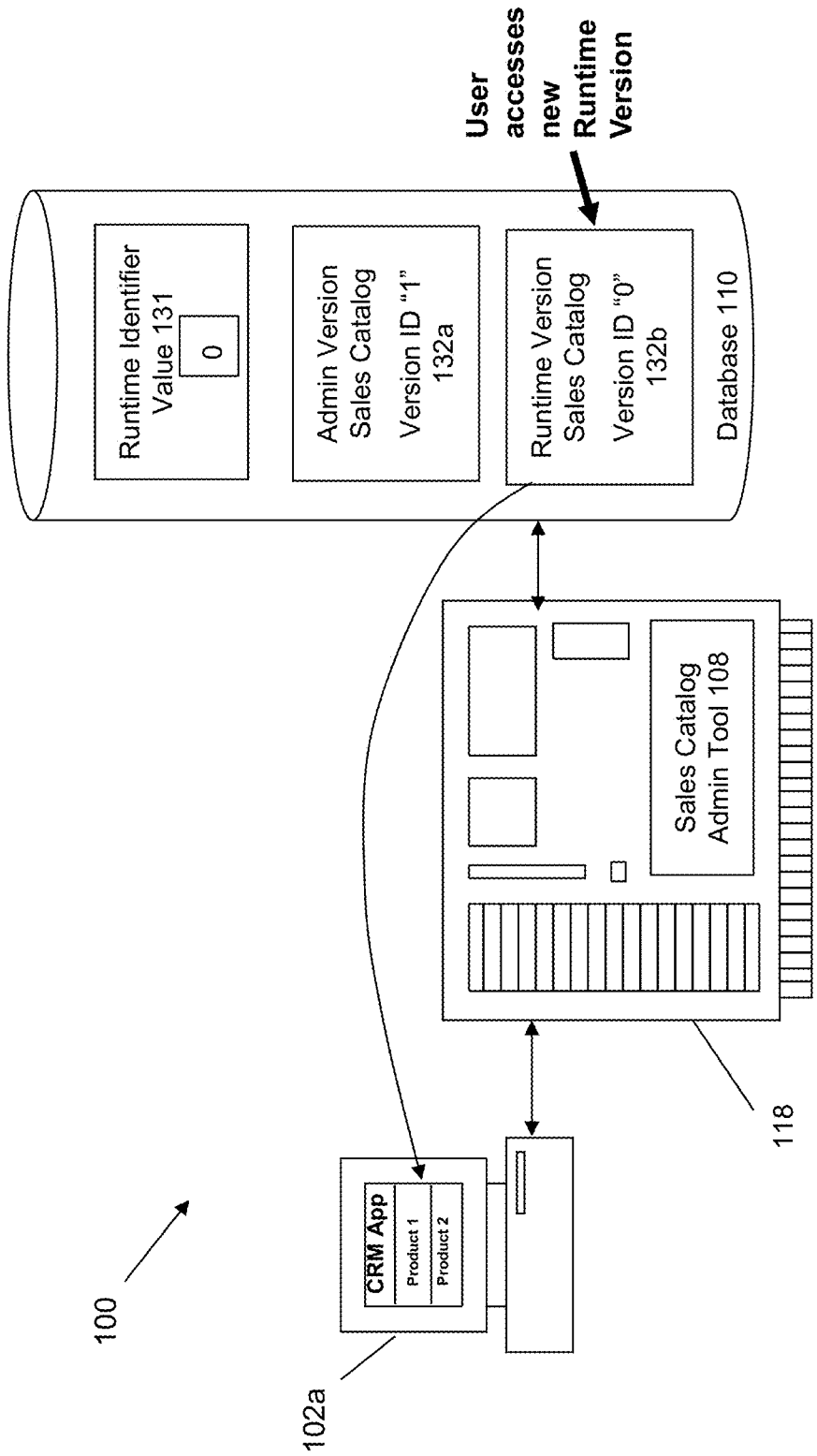

As shown in FIG. 6D, this swap of the version numbers operates to effect publication of the version 132b into the workspace as the new run-time version of the sales catalog. This is because the new run-time version 132b (formerly admin version) is now associated with the appropriate version number (e.g., in metadata 131) to indicate that it is the run-time version of the sale catalog. The new admin version 132a (formerly runtime version) is associated with the appropriate version number (e.g., version number "1") to indicate that it is the admin version of the sale catalog.

In these embodiments, the admin change on the base objects is not visible to the runtime user interface (UI) until published, where the change on the base objects may contain changes that span across many (e.g., 20+) child tables. The product group may need to generate a large number of derived objects (such as denormalization tables) for efficient runtime query, where the derived object are not be visible to runtime UI until same admin change published. This invention supports operations of systems that require extensive validation to be run on derived object and base object which is time consuming, since the derived objects are separated from production users until published. In addition, the approach will not block the runtime UI while the derived object generation and validation is being performed. Within a single publish event, there may be involvement of any number of base objects, where the derived object creation is incremental and will not require unnecessary changes.

The above-described approach(es) are described as being applicable to perform versioning on base objects. Embodiments of the invention can also be applied to perform versioning on derived objects. In these embodiments, the derived object will have two version related field, where both has a value of either 1 or 0:

Runtime_Status
Admin_Status

The runtime user interface (UI) only look at records with the appropriate identifier value (e.g., RuntimeStatus=1). Therefore, any object that does not have RuntimeStatus=1 will not be displayed to the user. During derived object generation, the system slowly prepares the derived object, and the new record is added with RuntimeStatus=0 and AdminStatus=1. Since RuntimeStatus=0 for the new derived object, the runtime UI will not access this object for display to the user.

During activation time, within the same transaction of the base object version flipping and for those changed derived object, the system will copy the AdminStatus value to the RuntimeStatus value. Since the new derived record corresponds to RuntimeStatus=0 and AdminStatus=1, copying the AdminStatus value to the RuntimeStatus value will result in the derived record corresponding to RuntimeStatus=1 AdminStatus=1. This will make the derived object available to end user in one shot.

To delete an existing derived object, the system sets the value of AdminStatus=0 on the old derived object. During activation, this value for Adminstatus will make the object inactive.

To modify existing derived object, one can set AdminStatus=0 on the old derived object. A copy of it can be crated with modifications and values set for RuntimeStatus=0, AdminStatus=1 on the new copy.

In some embodiments, one cannot use the same approach for the base object as for the derived object. The system will not maintain two full copies of data. This is in contrast to the approach is which, in base object case, each child table has two full copies, e.g., for the admin version and runtime version.

The embodiments of the invention also provide an approach to identify the object(s) to publish. In this approach, the header of the base object and the derived object both have a batch key field to indicate whether it is part of current publish/activation job. A unique batch job key number is generated when starting a job to perform the publish operation. The base object selected to be part of job will be tagged with this batch key. When derived objects are generated, those objects been touched will be tagged with this batch key. On the final flip activation phase, the batch key can be used to identify the set of objects need to be flipped.

A lock mechanism can be implemented so that the base object will only be involved in one admin editing and batch job at any time. In some embodiments, concurrency control is performed where only one batch at a time is allowed to generate derived object. Although it is possible to relax the concurrency control enforcement to allow different batch to modify different set of the derived objects, this may require more complex handling to manage derived object generation.

Validations may be performed of the base and derived objects before activation. It is noted that both the base object and derived object have been tagged with the batch key and runtime/admin version number/status. By combining these criteria, one can query the published view of the derived object to perform a cross-validation. In effect, the criteria on the derived object to query the pre-published version of data is in some embodiments:

RuntimeStatus=1 and BatchKey is not current Batch
OR
AdminStatus=1 and BatchKey is current Batch Therefore, what has been described is an improved approach to implement versioning for enterprise applications, such as sales catalogs accessed by CRM systems. The embodiments of the invention provide an improved approach for implementing a handshake mechanism to permit effective versioning and updates for data within an enterprise application. According to some embodiments, version numbers are associated with sales catalog objects, where the appropriate version number is associated with the specific object to be published as the run-time object for the sales catalog.

System Architecture Overview

Figure 7:
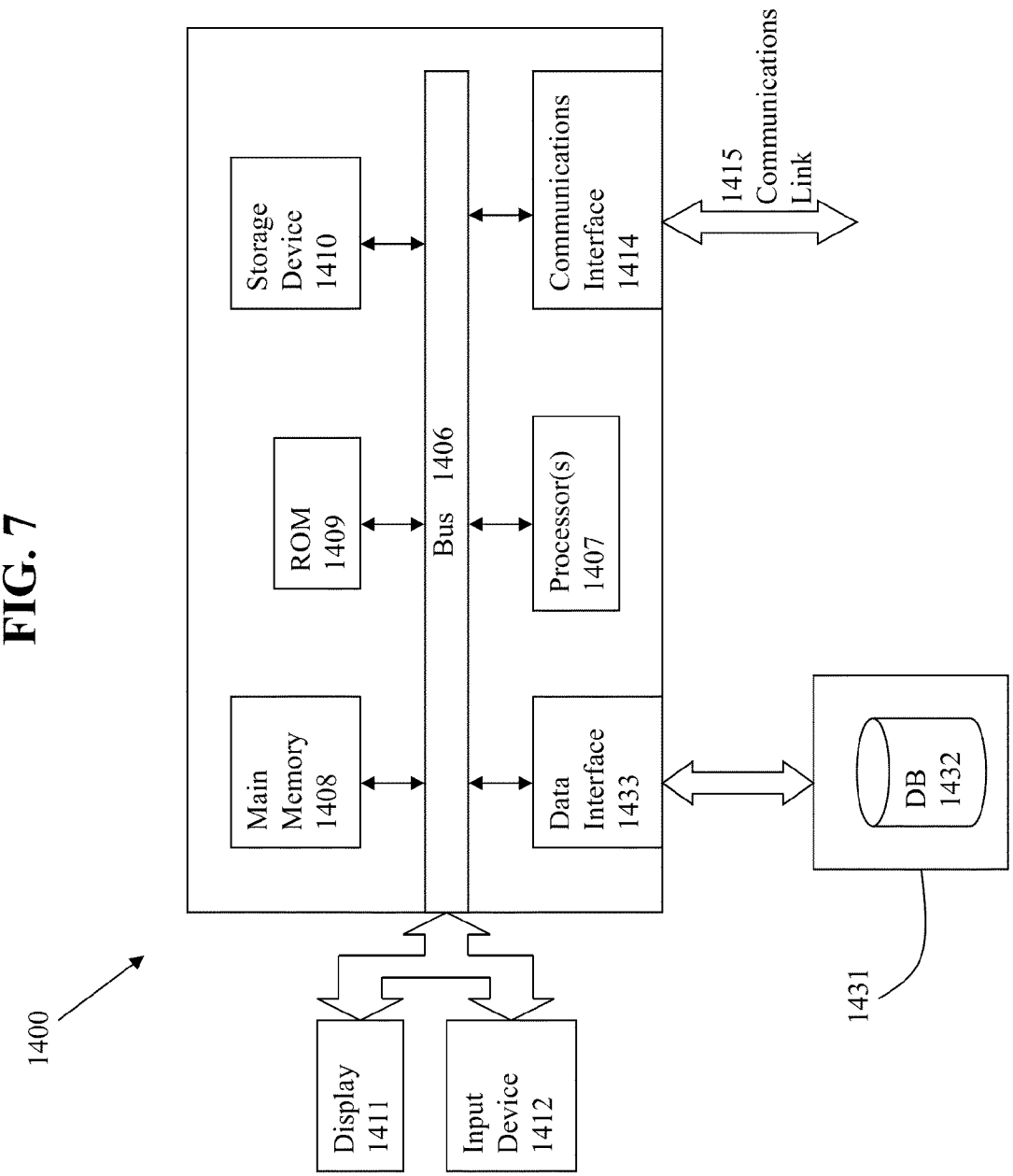
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
  implementing a set of tables to represent a sales catalog, the set of tables comprising a header table and a plurality of child tables, the header table having a table structure that organizes the plurality of child tables, and the plurality of child tables representing data associated with one or more portions of the sales catalog, wherein each of the header table and the plurality of child tables comprises one or more fields that correspond to a version identifier, the one or more fields comprising one of a first value of the version identifier associated with a run-time version of the sales catalog that is to be published during run-time or a second value of the version identifier associated with an admin version of the sales catalog that is to be used by an admin tool for editing a workspace;
  identifying a first version of the sale catalog as being the run-time version based at least in part on the first value of the version identifier, the run-time version generally accessible by users of an enterprise application;
  identifying the second version of the sales catalog as being an admin version based at least in part on the second value of the version identifier, the admin version not generally accessible to the users of the enterprise application;
  determining that the second version of the sales catalog should be published for general availability to the users of the enterprise application; and
  indicating that the second version of the sales catalog as the run-time version that is generally accessible by the users of the enterprise application by swapping the first value of the version identifier with the second value, wherein swapping of the version identifier does not swap data between the first version of the sales catalog and the second version of the sales catalog.

2. The method of claim 1, wherein the first value of the version identifier is assigned to the second version of the sales catalog to indicate that the second version of the sales catalog is now the run-time version that is generally accessible by the users of the enterprise application.

3. The method of claim 1, in which the version identifier for a runtime identifier metadata is swapped.

4. The method of claim 1, in which the first version of the sales catalog is configured to be the admin version that is not generally accessible to the users of the enterprise application.

5. The method of claim 1, in which a transaction is performed to swap the version identifier.

6. The method of claim 1, in which one or more post synchronization tasks are performed against the first version or the second version of the sales catalog.

7. The method of claim 6, in which the one or more post synchronization tasks comprise copying of content from the runtime version to the admin version of the sales catalog.

8. The method of claim 1, in which a change to the admin version of the sales catalog is not visible on a runtime interface for the sales catalog.

9. The method of claim 1, in which validation is performed before changing the admin version to the run-time version of the sale catalog.

10. The method of claim 1, in which the enterprise application accesses the version identifiers to determine the admin version and the run-time versions of the sales catalog.

11. The method of claim 1, further comprising implementing an external table structure that tracks whether the first value or the second value of the version identifier represents the run-time version of the sales catalog.

12. The method of claim 1, wherein the values in the one or more fields of each of the header table and the plurality of child tables are swapped in order to implement the swapping of the first value of the version identifier with the second value of the version identifier.

13. A non-transitory computer readable medium having stored thereon a sequence of instructions which, when executed by a processor causes the processor to execute a method comprising:
  implementing a set of tables to represent a sales catalog, the set of tables comprising a header table and a plurality of child tables, the header table having a table structure that organizes the plurality of child tables, and the plurality of child tables representing data associated with one or more portions of the sales catalog, wherein each of the header table and the plurality of child tables comprises one or more fields that correspond to a version identifier, the one or more fields comprising one of a first value of the version identifier associated with a run-time version of the sales catalog that is to be published during run-time or a second value of the version identifier associated with an admin version of the sales catalog that is to be used by an admin tool for editing a workspace;
  identifying a first version of the sale catalog as being the run-time version based at least in part on the first value of the version identifier, the run-time version generally accessible by users of an enterprise application;
  identifying the second version of the sales catalog as being an admin version based at least in part on the second value of the version identifier, the admin version not generally accessible to the users of the enterprise application;
  determining that the second version of the sales catalog should be published for general availability to the users of the enterprise application; and
  indicating that the second version of the sales catalog as the run-time version that is generally accessible by the users of the enterprise application by swapping the first value of the version identifier with the second value, wherein swapping of the version identifier does not swap data between the first version of the sales catalog and the second version of the sales catalog.

14. The computer readable medium of claim 13, wherein the first value of the version identifier is assigned to the second version of the sales catalog to indicate that the second version of the sales catalog is now the run-time version that is generally accessible by the users of the enterprise application.

15. The computer readable medium of claim 13, in which the version identifier for a runtime identifier metadata is swapped.

16. The computer readable medium of claim 13, in which the first version of the sales catalog is configured to be the admin version that is not generally accessible to the users of the enterprise application.

17. The computer readable medium of claim 13, in which a transaction is performed to swap the version identifier.

18. The computer readable medium of claim 13, in which one or more post synchronization tasks are performed against the first version or the second version of the sales catalog.

19. The computer readable medium of claim 18, in which the one or more post synchronization tasks comprise copying of content from the runtime version to the admin version of the sales catalog.

20. The computer readable medium of claim 13, in which a change to the admin version of the sales catalog is not visible on a runtime interface for the sales catalog.

21. The computer readable medium of claim 13, in which validation is performed before changing the admin version to the run-time version of the sale catalog.

22. The computer readable medium of claim 13, in which the enterprise application accesses the version identifiers to determine the admin version and the run-time versions of the sales catalog.

23. A system, comprising:
  a processor;
  a memory comprising computer code executed using the processor, in which the computer code implements
  implementing a set of tables to represent a sales catalog, the set of tables comprising a header table and a plurality of child tables, the header table having a table structure that organizes the plurality of child tables, and the plurality of child tables representing data associated with one or more portions of the sales catalog, wherein each of the header table and the plurality of child tables comprises one or more fields that correspond to a version identifier, the one or more fields comprising one of a first value of the version identifier associated with a run-time version of the sales catalog that is to be published during run-time or a second value of the version identifier associated with an admin version of the sales catalog that is to be used by an admin tool for editing a workspace, identifying a first version of the sale catalog as being the run-time version based at least in part on the first value of the version identifier, the run-time version generally accessible by users of an enterprise application, identifying the second version of the sales catalog as being an admin version based at least in part on the second value of the version identifier, the admin version not generally accessible to the users of the enterprise application, determining that the second version of the sales catalog should be published for general availability to the users of the enterprise application, and indicating that the second version of the sales catalog as the run-time version that is generally accessible by the users of the enterprise application by swapping the first value of the version identifier with the second value, wherein swapping of the version identifier does not swap data between the first version of the sales catalog and the second version of the sales catalog.

24. The system of claim 23, wherein the first value of the version identifier is assigned to the second version of the sales catalog to indicate that the second version of the sales catalog is now the run-time version that is generally accessible by the users of the enterprise application.

25. The system of claim 23, in which the version identifier for a runtime identifier metadata is swapped.

26. The system of claim 23, in which the first version of the sales catalog is configured to be the admin version that is not generally accessible to the users of the enterprise application.

27. The system of claim 23, in which a transaction is performed to swap the version identifier.

28. The system of claim 23, in which one or more post synchronization tasks are performed against the first version or the second version of the sales catalog.

29. The system of claim 26, in which the one or more post synchronization tasks comprise copying of content from the runtime version to the admin version of the sales catalog.

30. The system of claim 23, in which a change to the admin version of the sales catalog is not visible on a runtime interface for the sales catalog.

31. The system of claim 23, in which validation is performed before changing the admin version to the run-time version of the sale catalog.

32. The system of claim 23, in which the enterprise application accesses the version identifiers to determine the admin version and the run-time versions of the sales catalog.

* * * * *